United States Patent [19]
Gerhard, Jr.

[11] Patent Number: 5,290,984
[45] Date of Patent: Mar. 1, 1994

[54] DEVICE FOR POSITIONING CABLE AND CONNECTOR DURING SOLDERING

[75] Inventor: George H. Gerhard, Jr., Laureldale, Pa.

[73] Assignee: The Whitaker Corporation, Wilmington, Del.

[21] Appl. No.: 973,115

[22] Filed: Nov. 6, 1992

[51] Int. Cl.$^5$ .................. H05B 6/10; H01R 43/02
[52] U.S. Cl. .................. 219/616; 219/85.18; 219/659; 29/857; 29/860; 228/179.1
[58] Field of Search .................. 219/9.5, 105.3, 85.11, 219/10.67, 10.73, 85.18, 10.57; 29/857, 860, 861, 862, 863; 228/44.3, 179

[56] References Cited

U.S. PATENT DOCUMENTS

| | | | |
|---|---|---|---|
| 4,256,945 | 3/1981 | Carter et al. | 219/10.75 |
| 4,420,877 | 12/1983 | McKenzie, Jr. | 29/739 |
| 4,558,918 | 12/1985 | Shores | 29/876 |
| 4,623,401 | 11/1986 | Derbyshire et al. | 148/13 |
| 4,626,767 | 12/1986 | Clappier et al. | 323/280 |
| 4,659,912 | 4/1987 | Derbyshire | 219/535 |
| 4,695,713 | 9/1987 | Krumme | 219/553 |
| 4,701,587 | 10/1987 | Carter et al. | 219/10.75 |
| 4,717,814 | 1/1988 | Krumme | 219/553 |
| 4,745,264 | 5/1988 | Carter | 219/553 |
| 4,789,767 | 12/1988 | Doijack | 219/9.5 |
| 4,852,252 | 8/1989 | Ayer | 29/860 |
| 4,991,288 | 2/1991 | Scholz | 29/854 |
| 5,064,978 | 11/1991 | Scholz | 219/9.5 |
| 5,227,596 | 7/1993 | McGaffigan et al. | 219/10.53 |

*Primary Examiner*—Philip H. Leung
*Attorney, Agent, or Firm*—Robert J. Kapalka

[57] ABSTRACT

A device for positioning a cable end and an associated connector during inductive heat soldering of the connector to the cable includes a housing having a pair of terminals connectable to a source of radio frequency (RF) current. A connector positioning section positions the connector so that a heating portion of the connector is disposed in a heating region. An electrical conductor assembly is operable to electrically connect the pair of terminals when the pair of terminals are connected to the RF current source. The conductor assembly includes a first electrically conductive contact bar immovably connected to one of the terminals. A second electrically conductive contact bar is slidable between a first position wherein the first contact bar is electrically disconnected from the other of the terminals, and a second position wherein the first contact bar is electrically connected to the other of the pair of terminals. The first and second contact bars cooperate to define the heating region when the second contact bar is in the second position. A clamp assembly attached to the housing is operable to releasably hold the cable when the heating portion of the connector is disposed in the heating region.

12 Claims, 6 Drawing Sheets

DEVICE FOR POSITIONING CABLE AND CONNECTOR DURING SOLDERING

BACKGROUND OF THE INVENTION

1. Field of the Invention

The invention relates to the field of positioning devices, and more particularly, to a device for positioning a cable end and an associated connector during inductive heat soldering of the cable to the connector.

2. Prior Art

An electrical connector having a bore or channel for receiving a cable end therein is generally terminated to the cable by crimping or soldering. In a known method of soldering an electrical connector to a cable, the connector includes a solder preform disposed at a selected location along the bore. With the cable end situated in the bore, a portion of the connector including the solder preform is heated in an inductive heating process to melt the solder preform, whereby the solder reflows around the cable end and, upon cooling, provides a secure electrical connection between the cable and connector.

The inductive heating process utilizes a self-regulating temperature source which, when energized by a constant amplitude, high frequency alternating current, generates thermal energy and achieves a resulting constant temperature. Such a temperature can be selected to be just higher than the ideal temperature at which solder melts. The self-regulating temperature source is disclosed in U.S. Pat. Nos. 4,256,945; 4,623,401; 4,659,912; 4,695,713; 4,701,587; 4,717,814; and 4,745,264, which are incorporated herein by reference. The self-regulating temperature source employs a substrate of copper or copper alloy or other conductive material of low electrical resistivity, negligible magnetic permeability and high thermal conductivity. Deposited on one surface thereof is a thin layer of thermally conductive magnetic material such as iron, nickel or a nickel-iron alloy having a much higher electrical resistance and magnetic permeability than the substrate material. When a radio frequency current is passed through a conductor in close proximity to such a two layer structure, thermal energy is generated in the magnetic surface layer until the temperature of the surface layer approaches the Curie temperature of the magnetic material. As the Curie temperature is approached, declining magnetic permeability of the surface layer causes a reduction in thermal energy generation until, at the Curie temperature, thermal energy generation ceases. At the same time, the thermally conductive substrate drains thermal energy from the surface layer, which tends to reduce the temperature of the substrate and increase its magnetic permeability, thereby increasing thermal energy generation so as to offset thermal losses to the substrate. By carefully selecting the particular magnetic material and conductive material and the thicknesses thereof, one can construct a self-regulating heat source which maintains a certain maximum temperature at a given current frequency. The maximum temperature is selected to be slightly above the solder melting temperature so as to achieve solder reflow while preventing excessive heat generation which could harm delicate electrical components.

In order to solder a connector to a cable using the inductive heating process, the connector and cable must be held in respective alignment while a portion of the connector is exposed to a high-frequency current field. Standard connectors are fairly small, and it is difficult to hold the connector and cable in alignment and to precisely target a heating portion of the connector with the high-frequency current field. The heating portion of the connector is generally at the cable receiving end of the connector. Prior art devices for positioning the connector have utilized an end face of the connector opposite from the cable receiving end as a locating surface of the connector in order to provide good access to the heating portion. A problem with these devices is that a different locator must be used for a right-angled connector than for a straight connector. Also, it is often desirable to produce short lengths of U-shaped jumper cable having a connector attached at each end. After a connector is attached to one end, the attached connector can interfere with positioning members of a holding device and prevent proper positioning of a connector to be attached to the other end of the cable. A simple device is needed which can readily position a cable end and an associated straight or angled connector during inductive heat soldering of the connector to the cable, and which will enable a connector to be soldered to both ends of a short U-shaped jumper cable.

SUMMARY OF THE INVENTION

It is an object of the invention to provide a device for positioning a connector and cable during inductive heat soldering of the connector to the cable.

It is another object of the invention to provide an inductive heat solder positioning device which accepts either straight or angled connectors.

It is a further object of the invention to provide an inductive heat solder positioning device which positions a cable end and connector together as a unit.

It is yet another object of the invention to provide an inductive heat solder positioning device which enables a connector to be soldered to both ends of a short U-shaped jumper cable.

It is still another object of the invention to provide an inductive heat solder positioning device which is simple to use.

These and other objects are accomplished by a device for positioning a cable end and an associated connector during inductive heat soldering of the connector to the cable, wherein the connector includes a cable receiving end face, a bore extending through the end face, and a solder preform disposed at a selected axial location along the bore to define a solder joint with the cable upon solder reflow, the end of the cable residing in the bore. The device comprises a housing including a pair of terminals connectable to a source of radio frequency alternating current. A connector positioning section attached to the housing is adapted to position the connector so that a heating portion of the connector at the axial location is disposed in a heating region. An electrical conductor assembly is operable to electrically connect the pair of terminals. The electrical conductor assembly includes a first electrically conductive contact bar immovably connected to one of the pair of terminals, and a second electrically conductive contact bar which is slidable between a first position wherein the first contact bar is electrically disconnected from the other of the pair of terminals, and a second position wherein the first contact bar is electrically connected to the other of the pair of terminals. The second contact bar may electrically connect with a third contact bar which is immovably connected to the other of the pair of terminals, or the second contact bar may electrically connect directly with the other of the pair of terminals. The first and second contact bars cooperate to define the heating region when the second contact bar is in the second position. A clamp is attached to the housing and is operable to hold the cable when the heating portion of the connector is disposed in the heating region. The clamp may include a pair of jaw members which are relatively movable between open and closed positions. The jaw members may be replaceable and selectable from among a group of jaw members which are differently dimensioned to accept cables having different thicknesses. A toggle is provided for moving the jaw members between the open and the closed positions.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
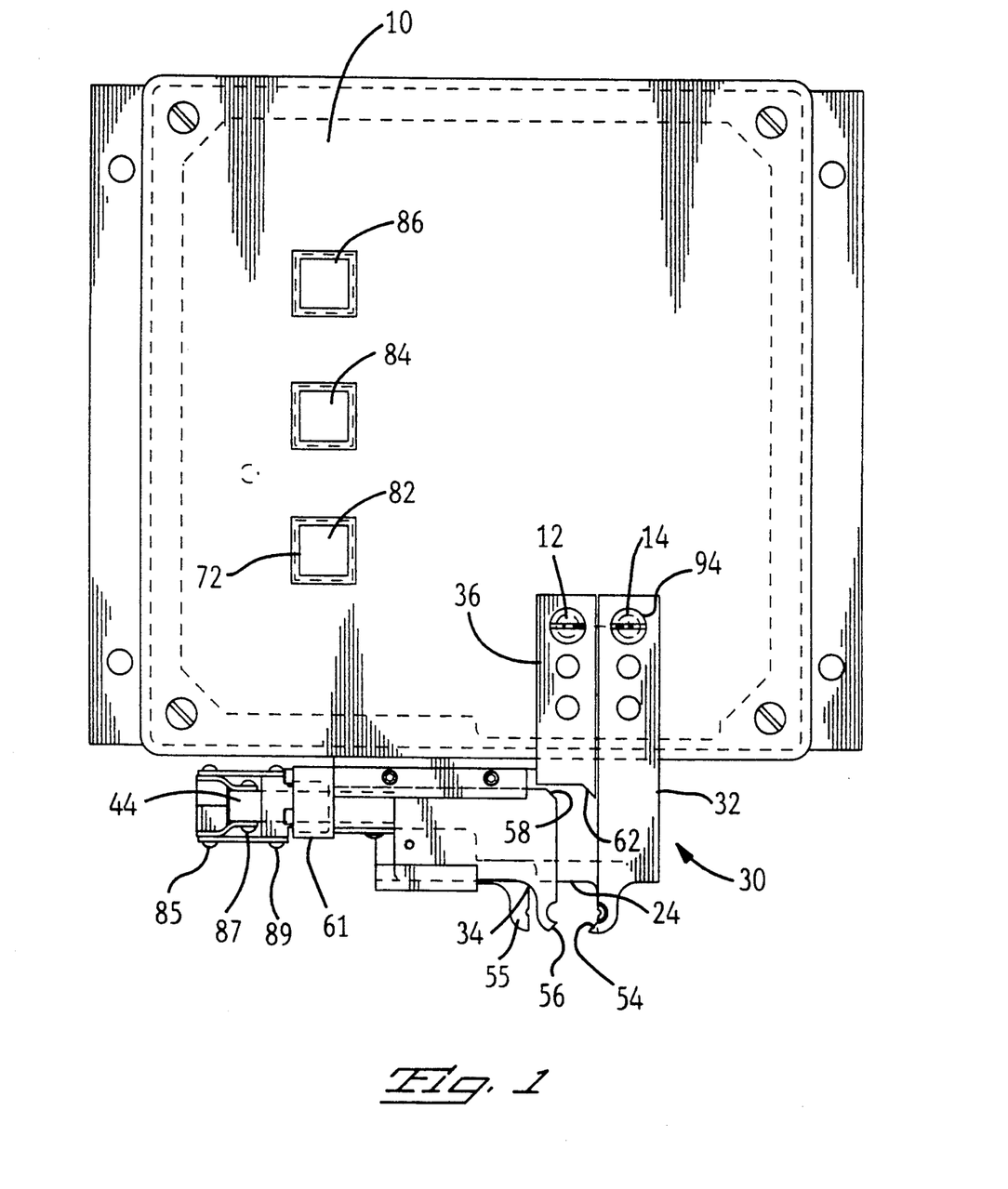
FIG. 1 is a top plan view of a device for positioning a cable and connector according to the invention, shown in an open position.
Figure 2:
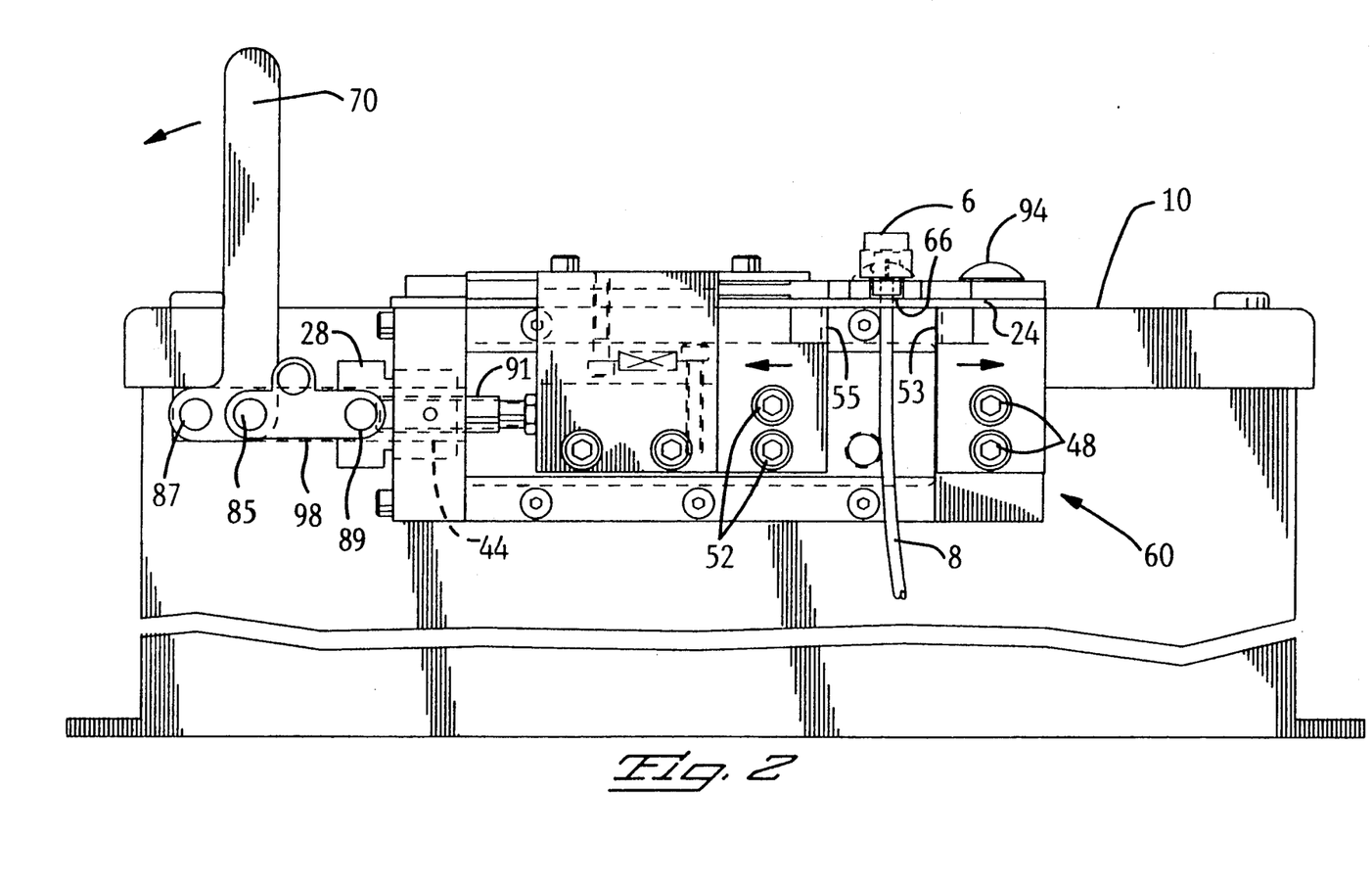
FIG. 2 is a front view of the device for positioning a cable and connector shown in an open position, a cable and connector being disposed preliminary to closing the device.

A device for positioning a cable end and an associated connector as shown in FIGS. 1 and 2 includes a housing 10 which may have any configuration suitable for supporting the operative elements of the device and for isolating electrical components as hereinafter described. The housing 10 includes a pair of terminals 12 and 14 which are connectable to a source of radio frequency alternating current (not shown) such as a frequency of 13.56 MHz. An apparatus for generating such a current is made by Metcal, Inc., of Menlo Park, Calif. and is disclosed in U.S. Pat. No. 4,626,767. The RF current generating apparatus may be enclosed within the housing 10 or may be housed in a separate enclosure and electrically connected to the pair of terminals 12, 14 by suitable wiring. The housing 10 includes a start button 72 which is operably connected to an electronic control circuit (not shown) within the housing 10. Pressing the start button 72 sends a start signal from the control circuit to the RF current source, thereby energizing the current source to produce an RF current which is conducted through a cable to the terminal 14. An indicator light 82 associated with the start button 72 glows whenever the RF current source is electrically energized.

Figure 3:
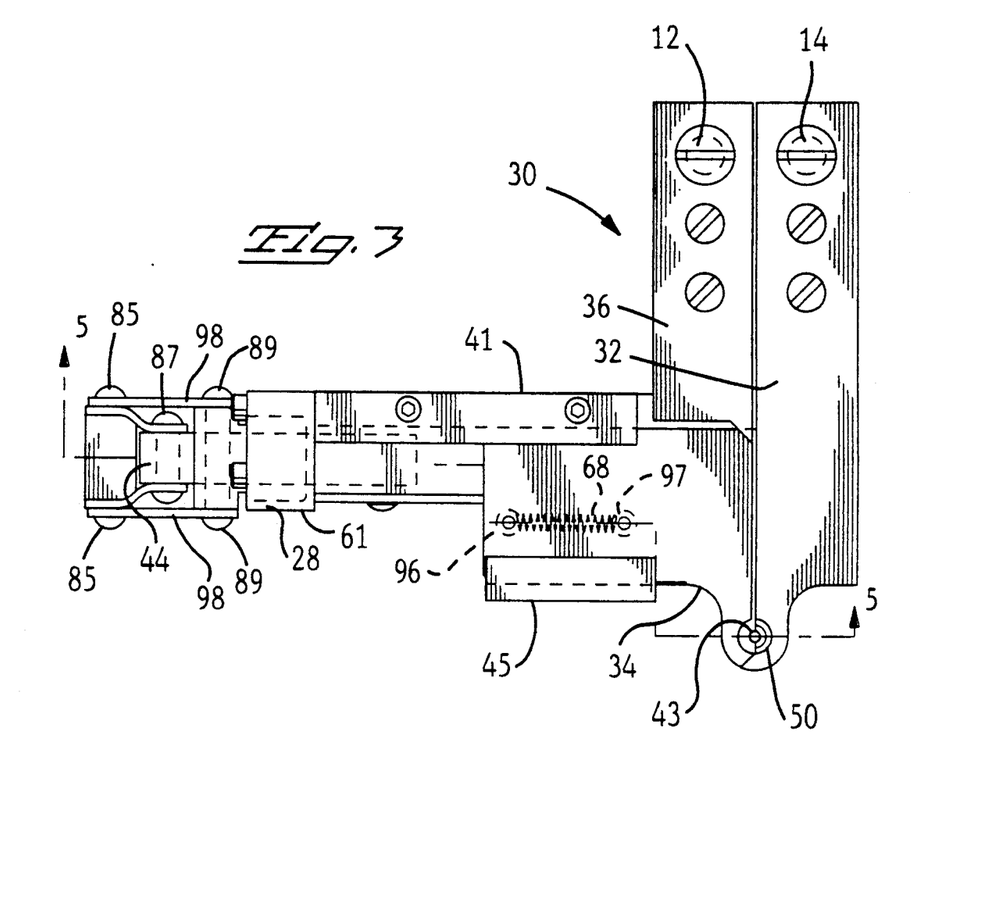
FIG. 3 is a top view of an electrical conductor assembly for the device for positioning a cable and connector, shown in a closed position.

An electrical conductor assembly shown generally as 30 is operable to electrically connect the pair of terminals 12, 14. As shown in FIGS. 1 and 3, the electrical conductor assembly includes a first electrically conductive contact bar 32 immovably connected to the terminal 14. In a preferred embodiment the terminal 14 comprises a threaded fastener having a head 94. The threaded fastener extends through an aperture in the first contact bar 32 and is threadedly secured to the housing 10 such that the first contact bar is secured beneath the head 94. A second electrically conductive contact bar 34 is slidable between first and second positions so as to make or break an electrical connection between the pair of terminals 12, 14. In the first position as shown in FIG. 1, the second contact bar 34 is retracted a distance from the first contact bar 32, and the terminals 12, 14 are electrically disconnected. In the preferred embodiment shown, a third electrically conductive contact bar 36 is immovably connected to the terminal 12. The first contact bar 32 and the third contact bar 36 are spaced a small distance apart so that there is no electrical connection between them. An insulating plastic film may be disposed on opposing faces of the contact bars 32, 34, 36 to further ensure against electrical connection of the contact bars except at defined contact areas to be described hereinbelow. The contact bars 32, 34, 36 are made from a metal having high electrical conductivity, preferably copper.

Figure 8:
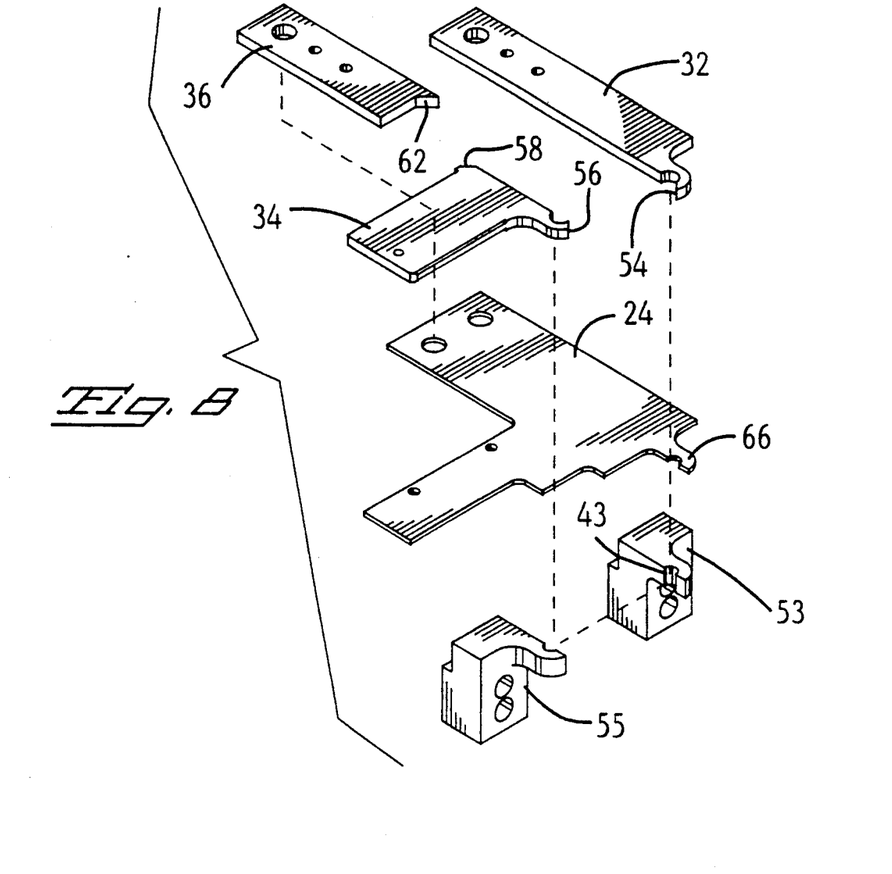
FIG. 8 is an exploded view of the electrical conductor assembly and clamp member for the positioning device according to the invention.
Figure 9:
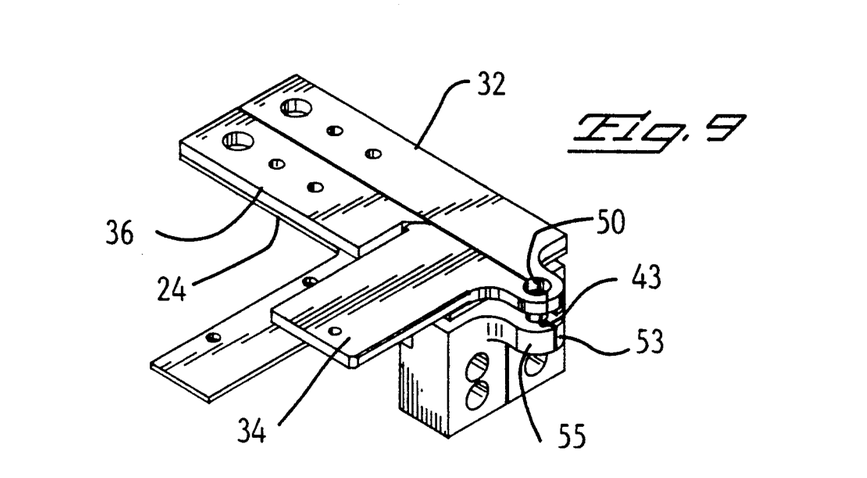
FIG. 9 is a detailed assembly view of the electrical conductor assembly and clamp member for the positioning device according to the invention.

As shown in FIGS. 1 and 8, the first contact bar defines contact end 54, and the second contact bar defines contact ends 56 and 58. Referring now to FIG. 3 wherein the second contact bar 34 is in the second position, the contact ends 54 and 56 are in abutting engagement such that the first and second contact bars 32, 34 are electrically connected. The contact end 58 is in abutting engagement with a contact end 62 of the third contact bar 36 such that the second and third contact bars 34, 36 are electrically connected, thereby completing an electrical conduction path between the terminals 12 and 14. The second contact bar is guided by slide cap 41 and slide guide 45 for transverse sliding movement between the first and second positions so that there is no pivoting of any component along the conduction path. Although the third contact bar 36 is disclosed, the second contact bar 34 could be configured such that the contact end 58 abuts directly against the terminal 12, thereby making the third contact bar dispensable. By utilizing both the second and third contact bars, applicant has been able to configure the conductor assembly such that the contact ends 58, 62 are disposed along sides of the second and third contact bars at a minimal distance from the contact bar 32, thereby advantageously utilizing current flow surface effects in the second and third contact bars.

Figure 4:
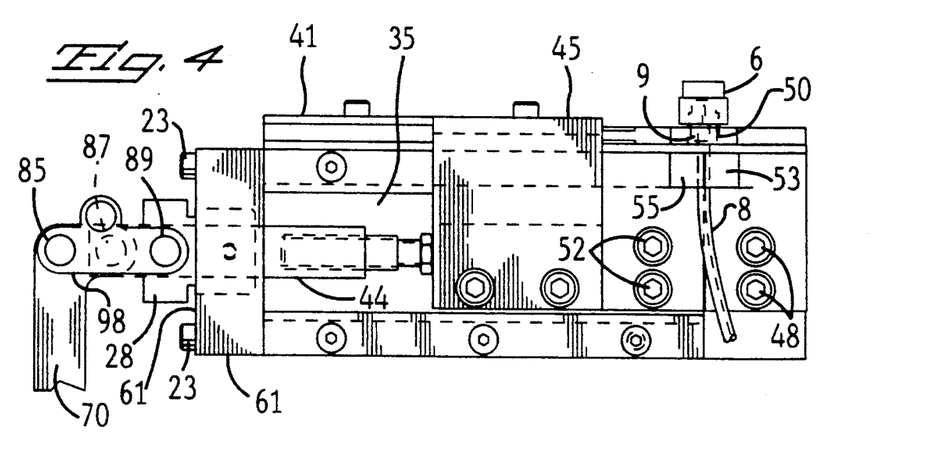
FIG. 4 is a front view of an electrical conductor assembly and clamp member for the device for positioning a cable and connector, shown in a closed position with a cable and connector being disposed in position for soldering.
Figure 6:
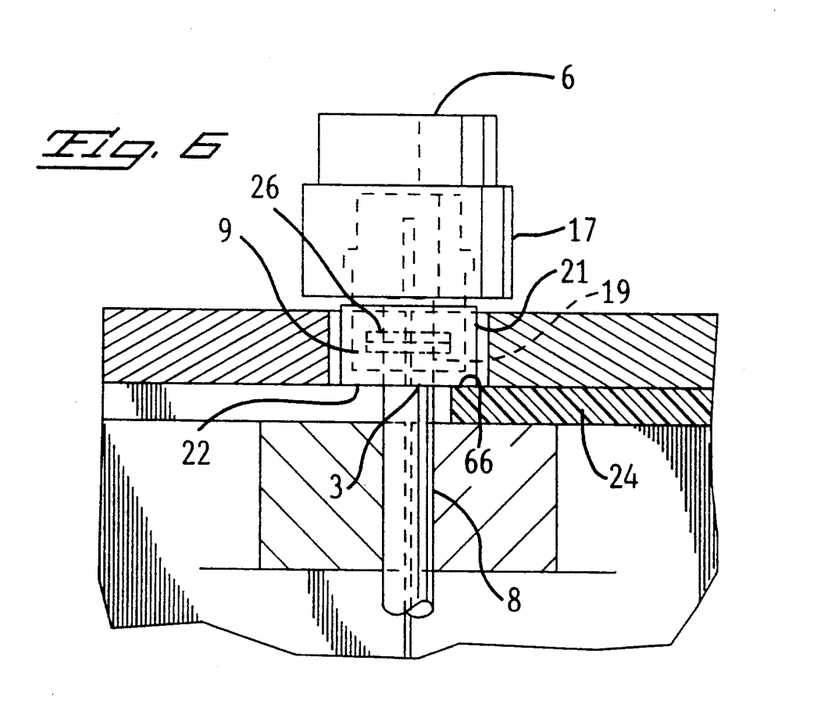
FIG. 6 is an enlarged view of a cable and connector disposed for soldering in the positioning device according to the invention.

The first and second contact bars cooperate to define a heating region 50 when the second contact bar is in the second position. The heating region 50 is defined by an aperture configured to closely encompass a heating portion 9 of connector 6 as shown in FIGS. 3 and 4. The connector 6 is a coaxial connector sold by AMP Incorporated of Harrisburg, Pa. under the designation SMA Plug Connector. As shown in detail in FIG. 6, the connector 6 has a main body portion 17 and a reduced diameter portion 21 which defines the heating portion 9. The heating portion 9 is constructed as a self-regulating temperature source as known in the prior art. The reduced diameter portion 21 terminates at a cable receiving end face 22 which defines a bore 3 dimensioned to receive a coaxial cable 8. A solder preform 26 is disposed at a selected axial location along the bore 3 within the heating portion 9. The coaxial cable 8 has a central signal conductor surrounded by an insulating layer and encased in a semi-rigid outer conductor. A cable end 19 is received in the bore 3 in the area of the heating portion 9.

A connector positioning section 24 is adapted to position the connector 6 so that the heating portion 9 of the connector 6 is disposed in the heating region 50. The connector positioning section 24 includes a ledge 66 which acts as a positioning surface for a selected surface of the connector 6 such as the end face 22. The ledge 66 can be defined by a semi-circular cutout in the positioning section 24. When the end face 22 is seated on the ledge 66, the heating portion 9 is accurately axially disposed in the heating region 50.

Figure 7:
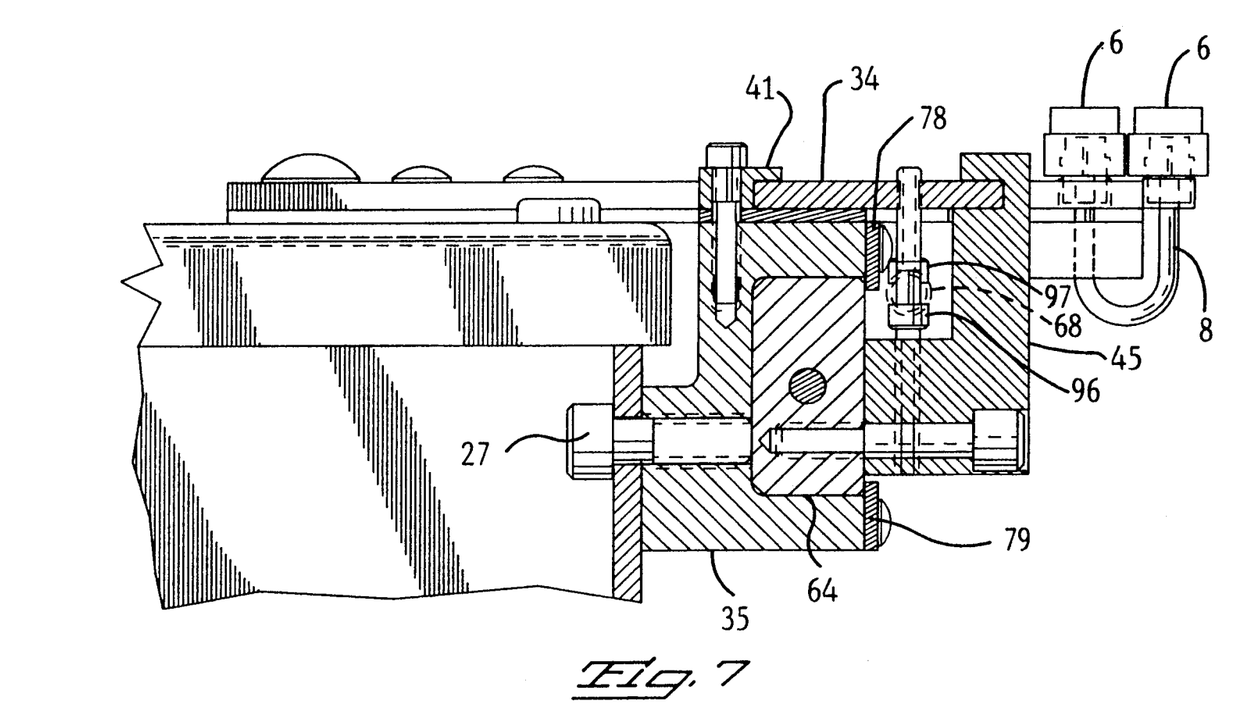
FIG. 7 is a side section view of the positioning device according to the invention, taken along lines B—B of FIG. 5.

Referring now to FIGS. 2, 4, 7 and 8, a clamp assembly shown generally as 60 is attached to the housing 10 and is operable for releasably holding the cable 8 when the heating portion 9 is disposed in the heating region 50. The clamp assembly includes a first jaw member 53 fixed to base 35 such as by threaded fasteners 48. The base 35 is fixed to the housing 10 by threaded fasteners 27, as best seen in FIG. 7. A second jaw member 55 is relatively movable between a closed position as shown in FIG. 4 wherein the cable 8 is held in the clamp assembly, and an open position as shown in FIG. 2 wherein the cable is released from the clamp assembly. When the clamp assembly is in the closed position, the first and second jaw members cooperate to define a bore 43 dimensioned to immovably hold the cable when the clamp is in the closed position. In order to accommodate different ones of the cable 8 having different dimensions, the first and second jaw members are replaceable by unscrewing threaded fasteners 48 and 52. The first and second jaw members are selectable from among pairs of first and second jaw members, different ones of the pairs cooperating to define the bore 43 being differently dimensioned.

The connector positioning section 24 is made from an electrically insulating material, preferably teflon, and is at least partly disposed between the electrical conductor assembly 30 and the clamp assembly 60 to electrically insulate the clamp assembly from the electrical conductor assembly.

Figure 5:
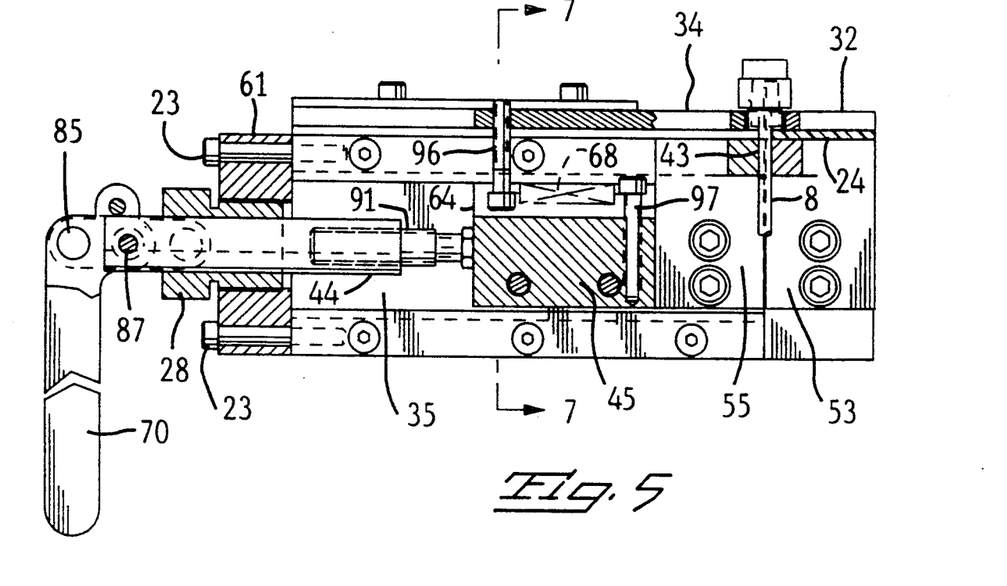
FIG. 5 is a front section view of the device for positioning a cable and connector, taken generally along lines A—A of FIG. 3.

Referring now to FIGS. 2-5, the clamp assembly is operable by pivoting movement of a toggle 70 having linkage connected for reciprocable displacement of slide 64 to which the second jaw member 55 is attached by the threaded fasteners 52. The toggle 70 includes an end defining a clevis that is pivotably attached to a pair of connecting links 98 by a pair of first connecting pins 85, and is pivotably attached to connecting rod 44 by second connecting pin 87. The connecting links 98 are pivotally connected to bushing 28 by a pair of third connecting pins 89. The bushing 28 is threadedly secured within adapter 61 which is fixed to base 35 by threaded fasteners 23. As shown in FIG. 5, the connecting rod 44 is threadedly engaged, through intermediate rod 91, with slide 64 to which the second jaw member 55 is attached. Since the bushing 28 is fixed with respect to the housing 10, pivoting of the toggle 70 on the second connecting pin 87 results in a simultaneous axial movement of the connecting rod 44 and the slide 64, and corresponding movement of the second jaw member 55 between the closed and open positions. As shown in FIG. 7, upper gib 78 and lower gib 79, which are attached to the base 35, extend beyond corners of the slide 64 and constrain the slide against separation from the base 35.

Referring again to FIG. 5, the second jaw member 55 and the second contact bar 34 are operably connected by a linkage that provides associated movement of said components. The linkage includes a spring biasing member 68 connected between post 96 extending from the second contact bar 34, and post 97 extending from the slide guide 45. As the second jaw member is moved from the open to the closed position by operation of the toggle 70, the spring 68 resiliently exerts a force on the second contact bar which urges the second contact bar toward its second, or closed, position. Before the second jaw member reaches its fully closed position, the contact ends 56 and 58 of the second contact bar come into abutting engagement with the contact ends 54 and 62 of the first and third contact bars, respectively. Further movement of the second contact bar by continued operation of the toggle requires extension of the spring 68 which produces a biasing force acting to maintain the second contact bar in its closed position. Conversely, as the toggle is operated to move the second jaw member to the open position and release the cable 8 from the clamp assembly, the spring maintains a biasing force which holds the second contact bar closed until the second jaw member has been moved a sufficient amount to completely relax the spring, after which continued operation of the toggle results in retraction of the second contact bar to its first, or disconnected, position.

An inductive heat soldering operation using the positioning device of the invention will now be described with reference to the drawings. Starting with the second jaw member 55 in the open position as shown in FIG. 2, the connector 6 having the cable end 19 of the cable 8 frictionally engaged therein is rested upon the ledge 66 of the connector positioning section 24. The toggle 70 is pivoted counterclockwise, thereby sliding the second jaw member to the right until the cable 8 is securely gripped in the bore 43 defined by the first and second jaw members, as shown in FIGS. 4 and 5. At the same time that the second jaw member is being moved, the second contact bar is resiliently urged to the right by the spring biasing member 68. When the second contact bar is in the fully closed position, the heating portion 9 of the connector 6 resting on the positioning section 24 is accurately positioned in the heating region 50 defined by the first and second contact bars. The heating portion 9 is disposed in the heating region with a clearance 15 between the heating portion and the contact bars, as shown more clearly in FIG. 6. The RF current source (not shown) which is connected to the terminals 12 and 14 should be on and in standby mode. The electronic control circuit (not shown) will illuminate interlock light 84 on the housing 10 when the control circuit senses an electrically open condition of the contact bars 32, 34 and 36. When an associated DC sense signal senses that a circuit is complete through the contact bars 32, 34 and 36 connected between the terminals 12 and 14, the interlock light 84 will extinguish, thereby indicating to operating personnel that the positioning device is fully closed and ready for operation. Pressing the start button 72 initiates a timer sequence dictated by the electronic control circuit and energizes the RF current source for a preset time period, 5 seconds for example, during which time the indicator light 82 is illuminated. The RF current flows in the conductor assembly around the heating portion of the connector and generates thermal energy in the heating portion as hereinabove described, whereby the solder preform is melted and reflowed around the cable end within the connector. After the preset time period, the RF current source is de-energized, the heating portion of the connector begins to cool and the solder re-hardens. Cooldown indicator light 86 is illuminated for a period of time dictated by the electronic control circuit to alert personnel of a high temperature condition in the connector and cable. When the cooldown indicator light extinguishes, the toggle may be safely operated to release the clamp assembly and disconnect the conductor assembly, and the process is ready to be repeated.

The invention has the advantage that a short length of U-shaped jumper cable having a connector soldered to one end can be received in the positioning device for soldering of a connector to the other end, as shown in FIG. 7. The positioning device can receive a U-shaped jumper cable with a pair of connectors having an axial separation as small as three-eighths inch. The invention also provides an electrical conduction path having no pivoting members, thereby minimizing wear of the conduction members and reducing the possibility of a defective conduction path due to faulty contact between the conduction members.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

I claim:

1. A device for positioning a cable end and an associated connector to be terminated thereto during inductive heat soldering of the connector to the cable, the connector including a cable receiving end face, a bore extending through the end face, and a solder preform disposed at a selected axial location along the bore to define a solder joint with the cable upon solder reflow, the end of the cable residing within the bore, the device comprising:

a housing including a pair of terminals connectable to a source of radio frequency alternating current;

a connector positioning section adapted to position the connector so that a heating portion of the connector at said axial location is disposed in a heating region;

an electrical conductor assembly operable to electrically connect the pair of terminals so as to complete an electrical circuit when the pair of terminals are connected to the source of radio frequency alternating current, the electrical conductor assembly including a first electrically conductive contact bar immovably connected to one of the pair of terminals, and a second electrically conductive contact bar which is slidable between a first position wherein the first contact bar is electrically disconnected from the other of the pair of terminals, and a second position wherein the first contact bar is electrically connected to the other of the pair of terminals, the first and second contact bars cooperating to define the heating region when the second contact bar is in the second position; and, a clamp attached to the housing and operable for releasably holding the cable when the heating portion of the connector is disposed in the heating region.

2. The device according to claim 1, wherein the clamp includes a first jaw member fixed to the housing, and a second jaw member which is relatively movable between a closed position wherein the cable is held in the clamp and an open position wherein the cable is released from the clamp.

3. The device according to claim 2, wherein the first and second jaw members cooperate when in the closed position to define a bore dimensioned to immovably hold the cable within the bore.

4. The device according to claim 3, wherein the first and second jaw members are replaceable and selectable from among pairs of first and second jaw members, different ones of the pairs defining the bore being differently dimensioned.

5. The device according to claim 1, further comprising a third electrically conductive contact bar connected to the other of the terminals, wherein the second contact bar engages between the first contact bar and the third contact bar when the second contact bar is in the second position.

6. The device according to claim 1, wherein the heating region is defined by an aperture dimensioned to closely encompass the heating portion of the connector.

7. The device according to claim 2, further comprising a toggle operable for moving the second jaw member between the open and the closed positions.

8. The device according to claim 2, wherein the second jaw member and the second contact bar are operably connected by a linkage.

9. The device according to claim 8, wherein the linkage includes a biasing member connected for biasing the second contact bar to the second position when the second jaw member is in the closed position.

10. The device according to claim 1, wherein the connector positioning section defines a positioning surface disposed to be abutted by a selected surface of the connector.

11. The device according to claim 10, wherein the connector positioning section is at least partly disposed between the electrical conductor assembly and the clamp.

12. The device according to claim 11, wherein the connector positioning section includes a ledge defining a semi-circular cutout, and the positioning surface is defined by the ledge.

* * * * *